(12) United States Patent
Minai et al.

(10) Patent No.: US 12,281,433 B2
(45) Date of Patent: Apr. 22, 2025

(54) CLOTHES DRYER

(71) Applicant: Samsung Electronics Co., Ltd., Suwon-si (KR)

(72) Inventors: Hitoshi Minai, Yokohama (JP); Toshifumi Hashimoto, Yokohama (JP); Shigenori Hato, Yokohama (JP); Ryo Aoki, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 890 days.

(21) Appl. No.: 17/298,200

(22) PCT Filed: Nov. 22, 2019

(86) PCT No.: PCT/KR2019/016072
§ 371 (c)(1),
(2) Date: May 28, 2021

(87) PCT Pub. No.: WO2020/111664
PCT Pub. Date: Jun. 4, 2020

(65) Prior Publication Data
US 2022/0090311 A1 Mar. 24, 2022

(30) Foreign Application Priority Data
Nov. 30, 2018 (JP) .................... 2018-225048

(51) Int. Cl.
*D06F 58/22* (2006.01)
*B01D 46/681* (2022.01)
*D06F 58/02* (2006.01)
(52) U.S. Cl.
CPC ........... *D06F 58/22* (2013.01); *B01D 46/681* (2022.01); *D06F 58/02* (2013.01); *B01D 2279/00* (2013.01)

(58) Field of Classification Search
CPC ...................................... D06F 58/22
See application file for complete search history.

(56) References Cited

U.S. PATENT DOCUMENTS

| 10,077,528 B2 | 9/2018 | Yoichi et al. |
| 2015/0121719 A1 | 5/2015 | Barrett et al. |
| 2016/0153136 A1* | 6/2016 | Yoichi ..................... D06F 58/22 34/604 |

FOREIGN PATENT DOCUMENTS

| GB | 2306132 A | * | 4/1997 | .......... B30B 11/225 |
| JP | H06156672 A | * | 6/1994 | |

(Continued)

OTHER PUBLICATIONS

International Search Report dated Mar. 20, 2020 in International Patent Application No. PCT/KR2019/016072.

(Continued)

*Primary Examiner* — Jason Lau
(74) *Attorney, Agent, or Firm* — STAAS & HALSEY LLP

(57) ABSTRACT

The present disclosure relates to a clothes dryer. The clothes dryer includes a drum configured to accommodate and dry clothes, and a lint removal device configured to remove lint in air flowing out of the drum. The lint removal device includes a filter part configured such that the lint is adhered thereto, and a screw rotatably disposed at an inner side of the filter part to push out the lint adhered to the filter part. The screw includes a shaft, and a blade extending from the shaft and having a helical shape, and the blade has elasticity to remove foreign substances introduced into the lint removal device without damage to the filter part.

10 Claims, 8 Drawing Sheets

(56) References Cited

FOREIGN PATENT DOCUMENTS

| | | |
|---|---|---|
| JP | 2013-123445 | 6/2013 |
| JP | 2016-101373 | 6/2016 |
| JP | 2016-101375 | 6/2016 |
| JP | 2018-49053 | 3/2018 |
| JP | 2018-134385 | 8/2018 |
| KR | 10-2014-0087554 | 7/2014 |
| KR | 10-2016-0064937 | 6/2016 |
| KR | 10-2016-0111684 | 9/2016 |

OTHER PUBLICATIONS

Notice of Preliminary Rejection issued by the Korean Patent Office Nov. 26, 2024 for the Korean Patent Application No. 10-2021-7003196.

* cited by examiner

FRONT ← → REAR

CLOTHES DRYER

CROSS-REFERENCE TO RELATED APPLICATIONS

This application is a U.S. National Stage Application, which claims the benefit under 35 U.S.C. § 371 of International Patent Application No. PCT/KR2019/016072, filed on Nov. 22, 2019, which claims the priority benefit of Japanese Patent Application No. 2018-225048, filed on Nov. 30, 2018 in the Japanese Patent and Trademark Office, the disclosures of which are hereby incorporated by reference in their entirety.

TECHNICAL FIELD

The disclosed technology relates to a clothes dryer, and more particularly, to a clothes dryer with a screw type lint removal device. The clothes dryer referred to here also includes a washing machine with a drying function.

BACKGROUND ART

A screw type lint removal device (briefly, also referred to as a lint removal device) in which lint (fluff) is collected by a filter having an arc shape in cross section and extending in a transverse direction, and the collected lint is scraped and pushed out by a screw to be removed from the filter is known. A clothes dryer provided with such a lint removal device in the middle of a circulation path of dry air is disclosed in, for example, Patent Documents 1 to 3.

Patent Document 1 (Japanese Patent Publication No. 2018-134385) discloses a clothes dryer capable of preventing foreign substances from entering a lint removal device and reducing the volume of lint discharged from the lint removal device.

Patent Document 2 (Japanese Patent Publication No. 2013-123445) discloses a clothes dryer in which lint attached to a filter may be reliably transferred by pressing a screw against the filter with a spring or the like. In addition, Patent Document 2 discloses a form in which not only opposite ends of the screw are supported, but also one end of the screw is supported.

Patent Document 3 (Japanese Patent Publication No. 2016-101373) discloses a configuration in which an elastic member is formed at a peripheral portion of a screw.

DISCLOSURE

Technical Problem

In a clothes dryer, in the circulating air, not only lint but also foreign substances such as buttons and pins that have fallen from clothes may also be introduced.

In a case where such the foreign substances are introduced into a screw type lint removal device, a filter may be damaged or a screw may not rotate due to the foreign substances being caught in the screw when lint is pushed out by the screw.

As in Patent Document 1, it is effective to prevent the entry of foreign substances into the lint removal device, but the entry of foreign substances may not be completely prevented. In the clothes dryer of Patent Document 2, because the entire screw is made of a hard resin, the screw may not cope with the caught foreign substances being caught therein. Likewise, as in Patent Document 3, only the configuration in which an elastic member is formed only at the peripheral portion of the screw may not adequately cope with foreign substances being caught in the screw.

When the entire screw is made flexible, because the screw is bent even when foreign substances are introduced, damage to the filter or a caught state of foreign substances may be reduced. However, because a certain degree of "clearance" is required between the screw and the filter, and there are dimensional variations due to mass production, in the above case, lint may not be properly collected and transferred.

In addition, the scraped lint needs to be compactly shrunk. To this end, in the clothes dryer of Patent Document 3, lint is compressed when the lint is pushed out by a screw. However, when the entire screw is flexible, compression of lint becomes difficult.

The disclosed technology is directed to providing a clothes dryer capable of adequately coping with the introduction of foreign substances and operating stably.

Technical Solution

An aspect of the present disclosure provides a clothes dryer including a drum configured to accommodate and dry clothes, and a lint removal device configured to remove lint in air flowing out of the drum, wherein the lint removal device includes a filter part configured such that the lint is adhered thereto, and a screw rotatably disposed at an inner side of the filter part to push out the lint adhered to the filter part, and wherein the screw includes a shaft, and a blade extending from the shaft and having a helical shape, and wherein the blade has elasticity and has a rigidity less than that of the shaft.

A predetermined gap may be formed between the screw and the filter part.

The lint removal device may further include a driving device provided on one side of the lint removing device to rotate the screw.

When a foreign substance is introduced into the lint removal device, damage to the filter part may be prevented by the elasticity of the blade.

The shaft may be made of steel and the blade may be made of plastic.

The lint removal device may further include a lint compression part connected to one end of the filter part to compress the lint pushed out by the screw.

The blade may be configured such that a rigidity of a portion located at an inner side of the filter part and a rigidity of a portion located at an inner side of the lint compression part are different.

The blade may be made of a single material.

The blade may be configured such that a thickness of a portion located at an inner side of the filter part and a thickness of a portion located at an inner side of the lint compression part are different.

The lint compression part may have a tapered surface gradually decreasing in diameter from the filter part.

The lint compression part may include a compression assistance part protruding inward of the tapered surface to facilitate compression of the lint.

When a foreign substance is caught between the compression assistance part and the blade so that forward rotation of the screw is impossible, the screw may be rotated in the reverse direction.

The compression assistance part may be configured to be farther away from the blade when the screw is rotated in the reverse direction.

The lint removal device may further include a bearing configured to support one side of the screw so that the screw is rotatable.

The screw may be configured to shake relative to the bearing when an external force is applied on the screw.

Advantageous Effects

A clothes dryer according to the disclosed technology can appropriately cope with the introduction of foreign substances and can operate stably.

MODE OF THE DISCLOSURE

Hereinafter, an embodiment of the disclosed technology will be described in detail with reference to the accompanying drawings. The following description is essentially merely illustrative and does not limit the present disclosure, its application, or its use.

<Overall Structure of Clothes Dryer>

Figure 1:
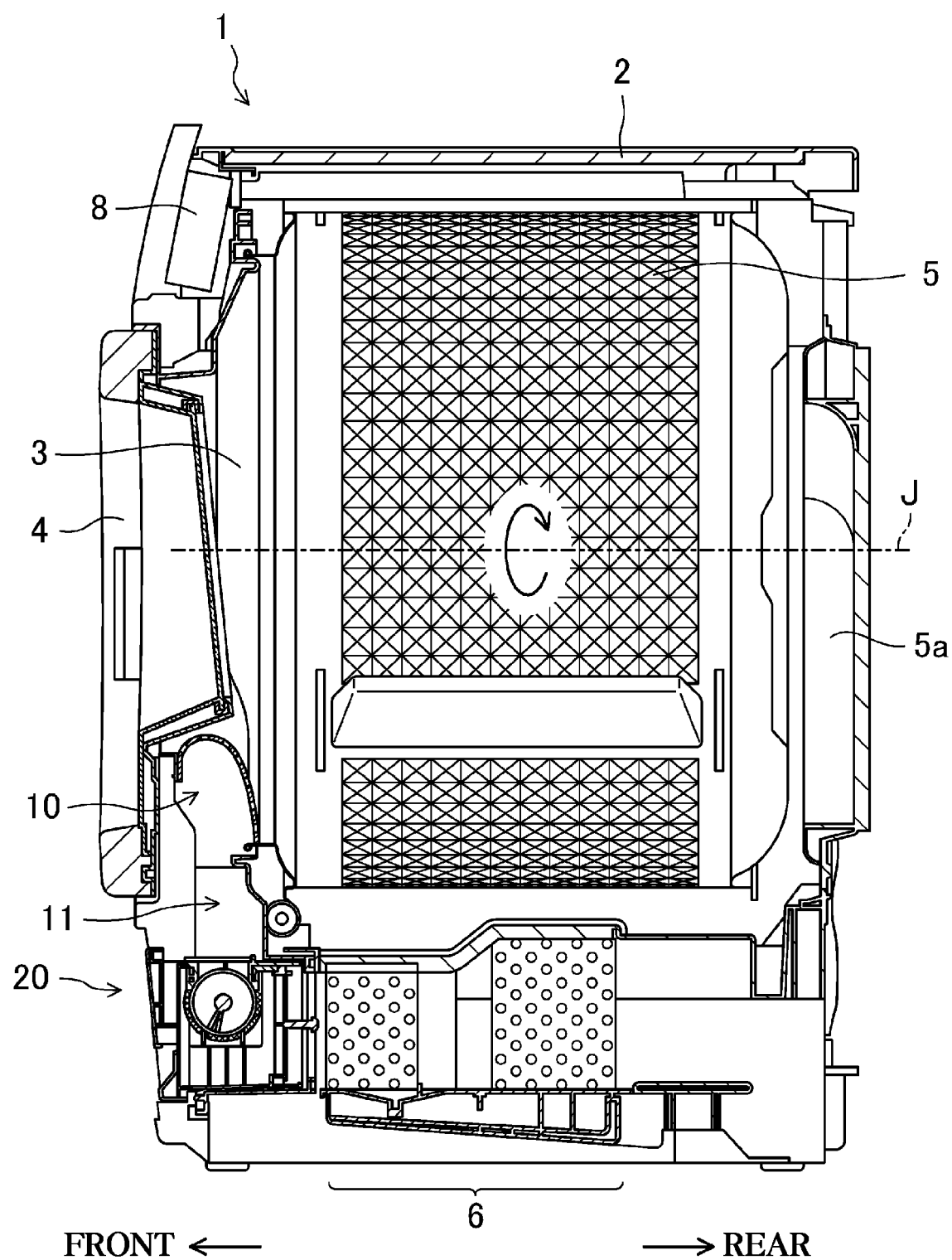
FIG. 1 is a schematic cross-sectional view illustrating a specific structure of a clothes dryer to which the disclosed technology is applied.
Figure 2:
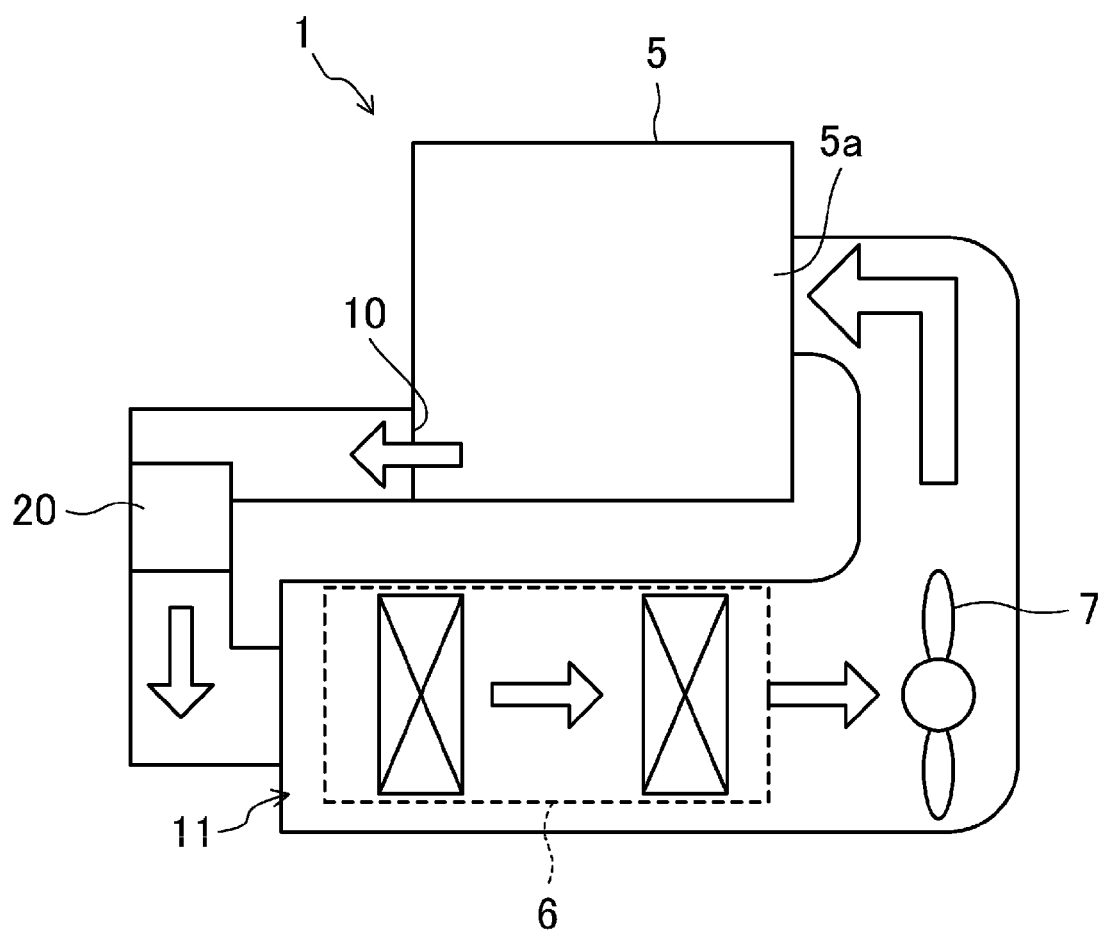
FIG. 2 is a schematic diagram illustrating an air circulation structure corresponding to the clothes dryer in FIG. 1.

FIGS. 1 and 2 illustrate a clothes dryer 1 to which the disclosed technology is applied. FIG. 1 illustrates a specific structure of the clothes dryer 1, and FIG. 2 schematically illustrates the structure of the clothes dryer 1. The clothes dryer 1 is an air circulation type. However, the disclosed technology may also be applied to an air non-circulating clothes dryer in which air does not circulate.

The clothes dryer 1 circulates air to generate dry air and flows the dried air into a drum 5, thereby drying clothes. The clothes dryer 1 includes a main body 2 having a substantially rectangular parallelepiped shape. An opening 3 to allow clothes to be put in and taken out is formed at a slightly upper portion of a front surface of the main body 2. A door 4 is installed in the opening 3 through a hinge (not shown). The opening 3 is opened and closed by the door 4.

Inside the main body 2, the drum 5 of a cylindrical shape having a bottom is installed. An opening corresponding to the opening 3 is formed on the drum 5 so that clothes may be put in and taken out. The drum 5 is rotatably supported by two rollers (not shown), for example. The drum 5 rotates about a rotation shaft J extending in a front-rear direction.

An exhaust port 10 through which air flowing out of the drum 5 is introduced is provided at a lower portion of the opening 3 in the main body 2. The exhaust port 10 is in communication with the ventilation duct 11 (air outflow path). A lint removal device 20 is disposed on a downstream side of the ventilation duct 11 to collect and remove lint (fluff) contained in the air flowing out of the drum 5 (Detailed description of the lint removal device 20 will be described later).

In the main body 2, a heat exchanger 6 is provided below the drum 5. The heat exchanger 6 is disposed at a portion downstream of the lint removal device 20 in the ventilation duct 11. Air flowing through the ventilation duct 11 is dried by the heat exchanger 6. Air dried in the heat exchanger 6 is introduced into the drum 5 from an air supply port 5a provided on a rear surface of the drum 5 by a blowing fan 7.

As indicated by white arrows in FIG. 2, air that has absorbed moisture from clothes in the drum 5 flows out to the ventilation duct 11 through the exhaust port 10 and is dehumidified and dried in the heat exchanger 6 via the lint removal device 20. Then the dried air flows back into drum 5. In this way, air circulates.

A controller 8 (control device) is installed on an upper portion of the main body 2. The controller 8 comprehensively controls an operation of the clothes dryer 1. The controller 8 is composed of hardware such as a CPU and memory, and software such as a control program and various data. The controller 8 controls an operation of the lint removal device 20 to execute a process of rotating a screw 23 in the reverse direction (locking canceling process) when rotation of the screw 23 is not possible, which will be described later in detail.

<Lint Removal Device 20>

Figure 3:
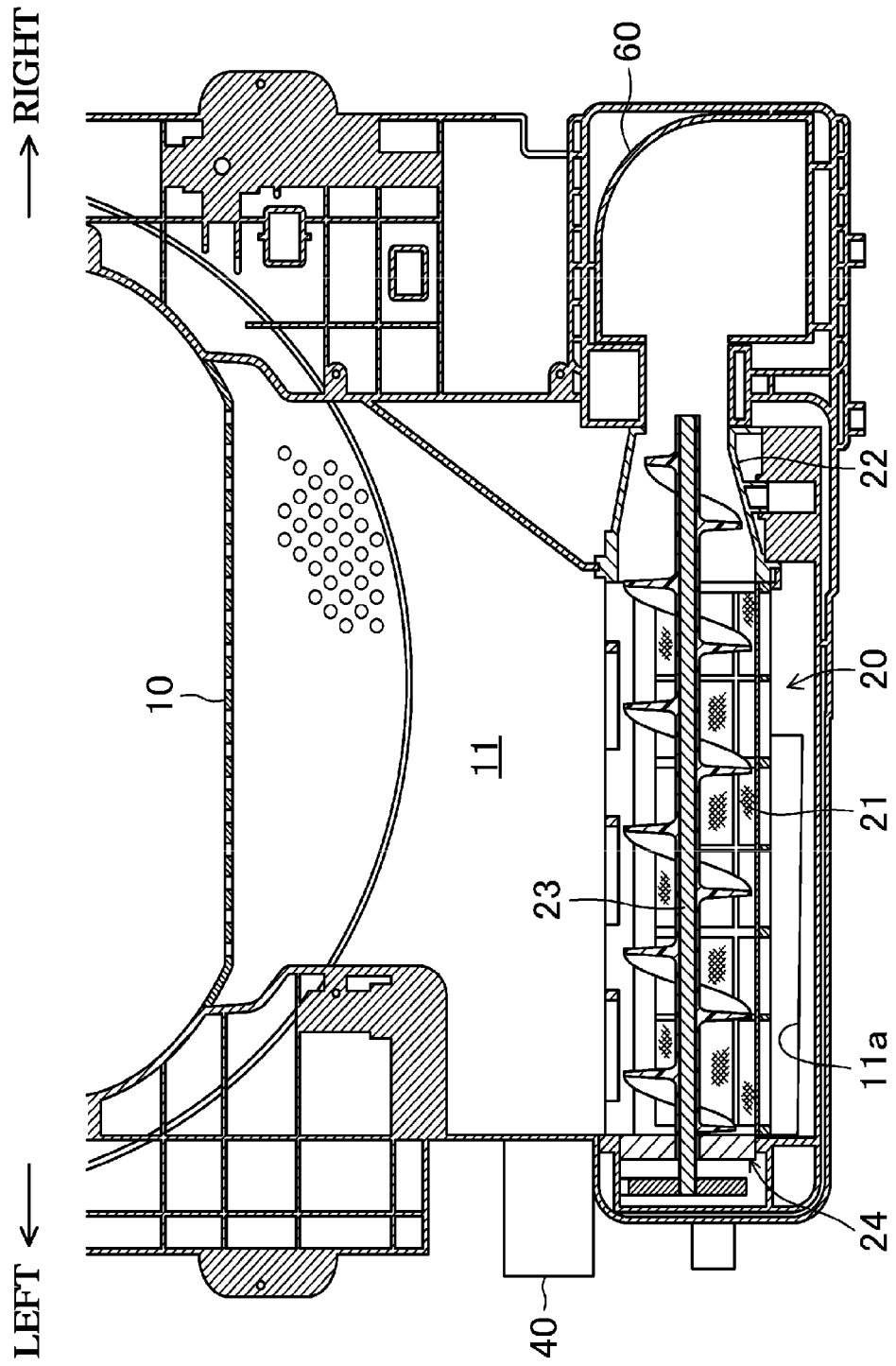
FIG. 3 is a schematic view illustrating a specific structure of a main part.
Figure 4:
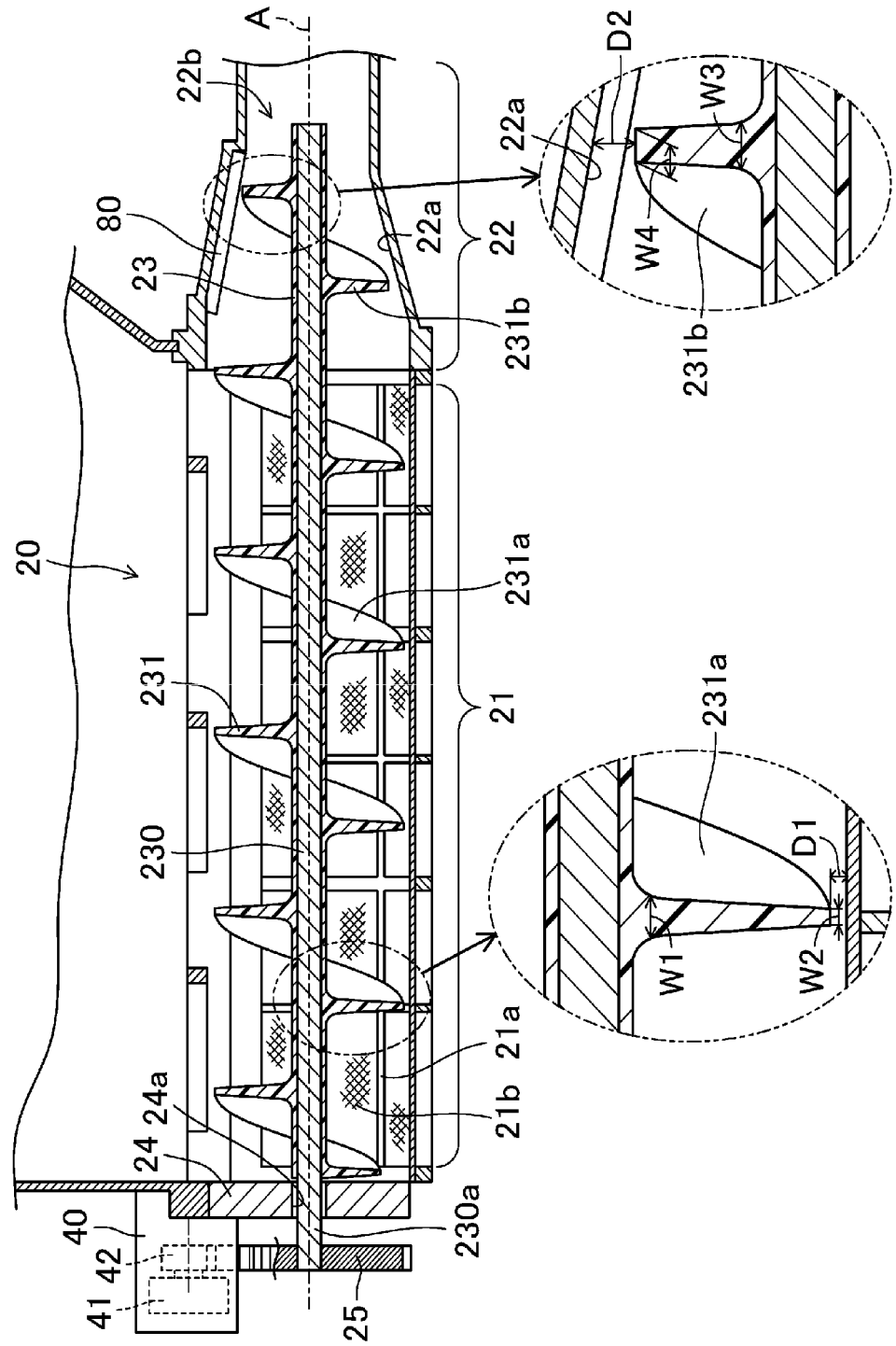
FIG. 4 a schematic view illustrating a structure of a lint removal device.

FIG. 3 illustrates a specific structure of a portion of the ventilation duct 11 extending from the exhaust port 10 to the lint removal device 20, and the lint removal device 20. FIG. 4 illustrates an enlarged view of the lint removal device 20.

The lint removal device 20 is disposed below the exhaust port 10. In the rear of the lint removal device 20, an opening 11a is located on the downstream side of the ventilation duct 11 facing the heat exchanger 6. A driving device 40 to drive the lint removal device 20 is disposed above a left end of the lint removal device 20.

A lint box 60 to accommodate lint removed by the lint removal device 20 is disposed in a position adjacent to the lint removal device 20 (right side when the clothes dryer 1 is viewed from the front). The lint box 60 is detachable from the main body 2.

The lint removal device 20 is composed of a filter part 21, a lint compression part 22, a screw 23, a bearing 24, and the like. The filter part 21 includes a filter mounting frame 21a and a filter 21b.

Figure 7A:
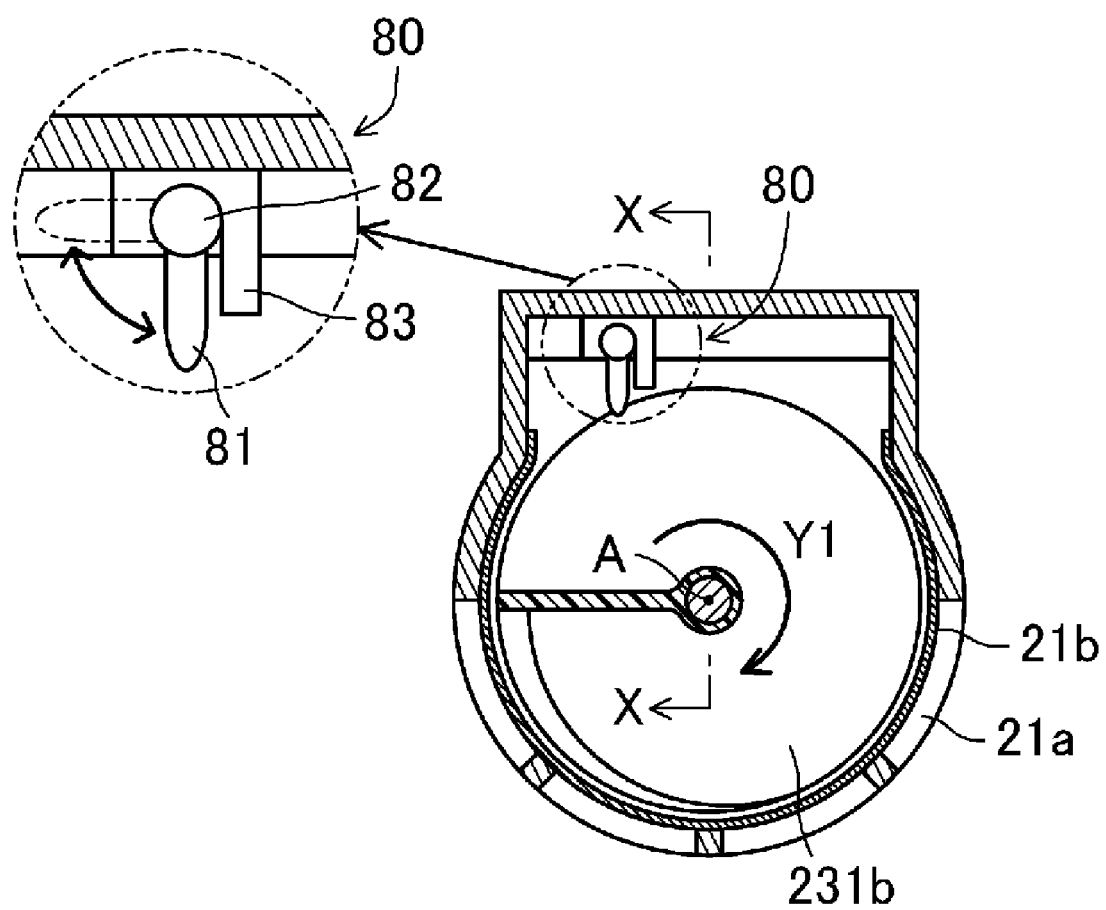
FIG. 7A is a view for explaining a structure of a compression assistance part.

The filter mounting frame 21a is formed of a grid-shaped resin frame, has an arc-shaped cross section, and extends long in a transverse direction (see FIG. 7A). The filter mounting frame 21a has an opening facing upward and is disposed to extend in the left-right direction and traverse the ventilation duct 11.

The filter 21b is form of a sheet-shaped member having a mesh, and is disposed at an inner side of the filter mounting frame 21a. Accordingly, the filter part 21 is disposed in the middle of the ventilation duct 11 in a state in which a cross section of the filter part 21 on which the filter 21b is mounted faces an upstream side of an airflow in an inner surface of the arc-shaped filter mounting frame 21a.

Therefore, lint contained in the air flowing out of the drum 5 is attached to an inner surface of the filter part 21. The filter part 21 is detachable from the lint removal device 20.

The lint compression part 22 is continuously formed on the right side of the filter part 21. Specifically, the lint compression part 22 is integrally connected to a right end of the filter part 21 and extends from the right end of the filter part 21 to the right. The lint compression part 22 is formed in a conical shape with a cut off tip and has a tapered surface 22a that gradually decreases in diameter as it is further away from the filter part 21 side to the right.

A lint outlet 22b is formed at a right end of the lint compression part 22. The lint outlet 22b is in communication with the lint box 60. The lint compression part 22 is also provided with a compression assistance part 80, which will be described later.

The screw 23 is disposed at an inner side of the filter part 21 and the lint compression part 22 to extend in the left-right direction along the filter part 21 and the lint compression part 22. The screw 23 includes a shaft 230 and a blade 231 provided around the shaft 230.

The shaft 230 is formed of a rod-shaped member and extends along the filter part 21 and the lint compression part 22. The blade 231 extends helically along the shaft 230 and is formed over a portion of the shaft 230 excluding a portion of a left end from a right end. The blade 231 is formed such that a thickness thereof gradually decreases in a direction from a base end (end on the shaft 230 side) toward a front end (tip). The shaft 230 is provided with a shaft support portion 230a at the left end thereof without the blade 231.

In the lint removal device 20, the shaft 230 is made of a material of a high rigidity, and the blade 231 is made of a material of low rigidity having elasticity. Specifically, the shaft 230 is made of a metal rod such as steel, and the blade 231 is made of rubber or plastic having elasticity.

The bearing 24 has a function of rotatably supporting the screw 23, and only one of the bearing 24 is provided on the left side of the filter part 21 in the lint removal device 20. That is, only one side of the screw 23 is supported.

The bearing 24 is configured to be integrated with a left end of the filter mounting frame 21a. The bearing 24 is formed of a resin material. The bearing 24 has a shaft hole 24a through which the shaft support portion 230a is inserted and penetrates. It is set such that a slight clearance exists between the shaft support portion 230a and the shaft hole 24a (clearance fit).

Because the shaft 230 of a metal material itself is relatively heavy, an appropriate force that makes the right side of the screw 23 incline downward with bearing 24 as a support point is applied on the screw 23 on which one side is supported. Accordingly, a lower end portion of the screw 23 is in contact with the filter part 21 and the lint compression part 22 with an appropriate pressure.

The left end of the shaft 230 protrudes from the bearing 24 to the left. A driven gear 25 having a large diameter is fixed to the protruding portion of the shaft 230. A motor 41 controlled by the controller 8 is installed in the driving device 40. A drive gear 42 having a small diameter is fixed to the shaft of the motor 41, and the drive gear 42 engages with the driven gear 25.

Accordingly, the motor 41 is driven to rotate under the control of the controller 8, so that the screw 23 rotates around an axis A at a relatively low number of revolutions. The motor 41 is configured to be capable of forward rotation and reverse rotation.

The blade 231 has portions having different rigidity in an axial direction (the direction in which the axis A extends). Specifically, a portion located at the inner side of the filter part 21 (filter-side blade 231a) and a portion located at an inner side of the lint compression part 22 (outlet-side blade 231b) have different rigidity, and the outlet-side blade 231b is set to have a higher rigidity than the filter-side blade 231a.

In the case of this embodiment, because the entire blade 231 is made of the same material, the outlet-side blade 231b is formed with a thicker blade than the filter-side blade 231a. For example, as illustrated in FIG. 4, while in the filter-side blade 231a, a thickness W1 on the base end is about 3 mm and a thickness W2 on the front end is about 1 mm, the outlet-side blade 231b, a thickness W3 on the base end is about 6 mm and a thickness W4 on the front end is about 3 mm.

An outer diameter of the screw 23 and inner diameters of the filter part 21 and the lint compression part 22 are set such that the screw 23, the filter part 21, and the lint compression part 22 face each other with a predetermined gap therebetween. That is, intervals between the screw 23 and each of the filter 21b and tapered surface 22a are set in accordance with the rigidity of the blade 231. The outlet-side blade 231b is formed so that an outer diameter thereof gradually decreases toward the right in accordance with the tapered surface 22a.

A distance D1 between the filter 21b and the screw 23 is different from a distance D2 between the tapered surface 22a and the screw 23. Specifically, the distance D1 between the filter 21b and the screw 23 is set to be smaller than the distance D2 between the tapered surface 22a and the screw 23. For example, the former is set to 0.5 mm or less, and the latter is set to about 1 mm.

<Operation of the Lint Removal Device 20>

Although the lint removal device 20 may be driven during a drying process depending on a situation, the lint removal device 20 is driven mainly after the drying process is finished, that is, when the circulation of the dried air is stopped.

Figure 5:
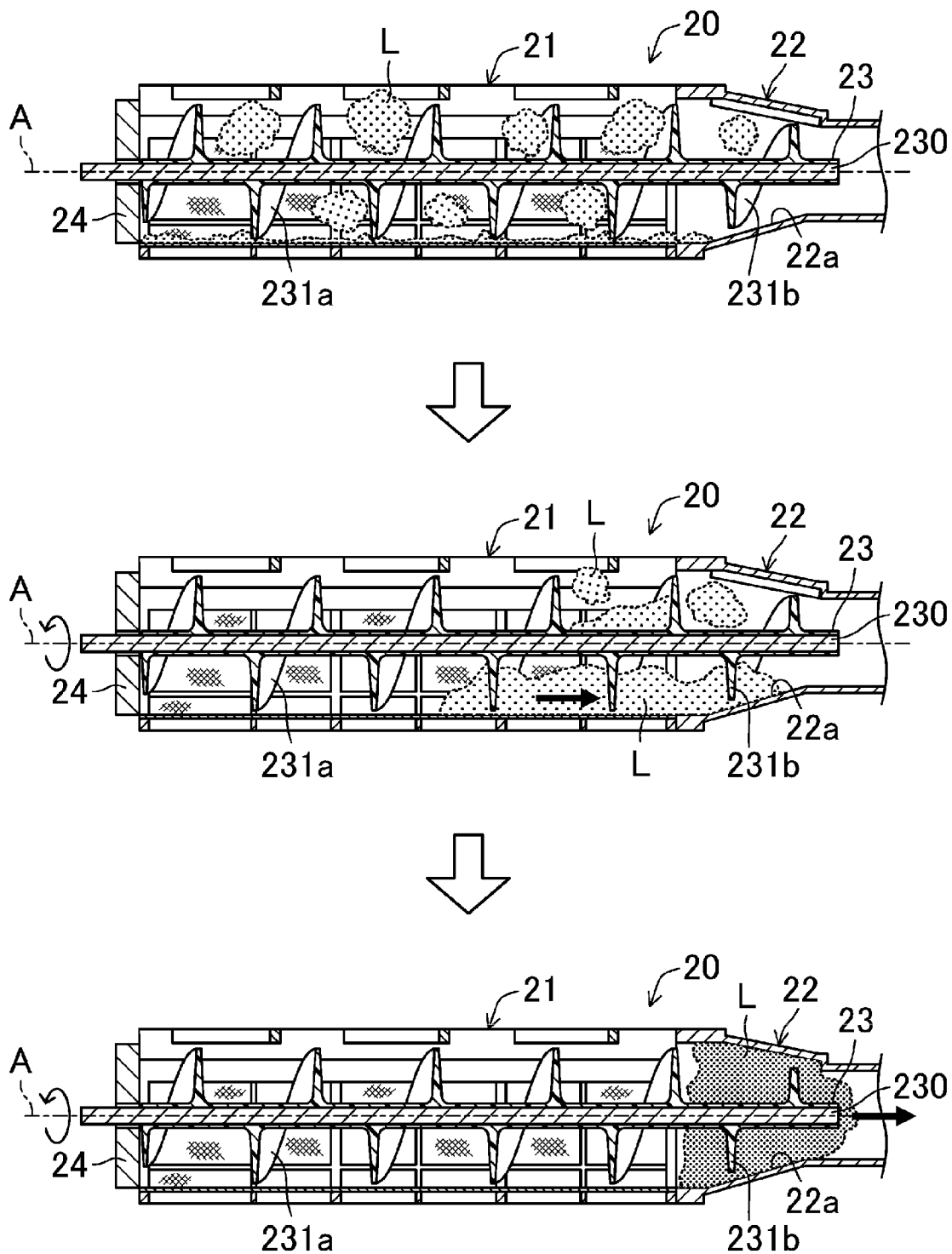
FIG. 5 is a view for explaining an operation of the lint removal device.

The operation of the lint removal device 20 will be described with reference to FIG. 5. After completion of the drying treatment, as shown in an upper view of FIG. 5, a lint L contained in the dried air is adhered to a surface of the filter 21b. As illustrated in a middle view of FIG. 5, the controller 8 drives the motor 41 to rotate the screw 23 in a direction of pushing the lint L.

Because the shaft 230 is composed of a metal rod of a high rigidity, the shaft 230 itself is hardly bent or twisted. In contrast, the filter-side blade 231a has elasticity, and is set to have a low rigidity to be able to scrape the lint L thinly deposited on the filter 21b. Further, a distance between the filter-side blade 231a and the filter 21b is set to be relatively short. The filter-side blade 231a is in contact with the filter 21b with an appropriate pressure due to a self-weight of the screw 23 on which one side is supported.

Accordingly, the screw 23 gradually pushes the lint L toward the lint compression part 22 while effectively scraping the lint L adhered to an inner surface of the filter 21b without being subjected to a strong rotational load due to frictional resistance.

As a result, the lint L adhered to the filter 21b is collected in the lint compression part 22. Because the lint compression part 22 has a tapered surface 22a, the lint L collected in the lint compression part 22 is compressed by the lint compression part 22 and becomes smaller as illustrated in a lower view of FIG. 5.

The outlet-side blade 231b is set to have a sufficient rigidity to compress the lint L. That is, the outlet-side blade 231b is set to compress the lint L almost without deformation. Accordingly, the lint L is compressed into a small size by the outlet-side blade 231b and the tapered surface 22a and then pushed to the lint box 60.

In this way, the controller 8 controls to remove the lint L from the filter 21b each time the drying process is performed by rotating the screw 23 for a predetermined time. In addition, clogging of the mesh of the filter 21b is suppressed.

In the circulating air, not only the lint L but also foreign substances such as buttons and pins that have fallen from clothes may also be introduced. In a case where such the foreign substances are introduced into the lint removal device 20, the filter 21b may be damaged or the screw 23 may not rotate due to the foreign substances being caught in the screw 23 when the lint L is pushed out by the screw 23.

On the other hand, the lint removal device 20 is configured to be able to suppress such defects. The above content will be explained with reference to FIG. 6.

Figure 6:
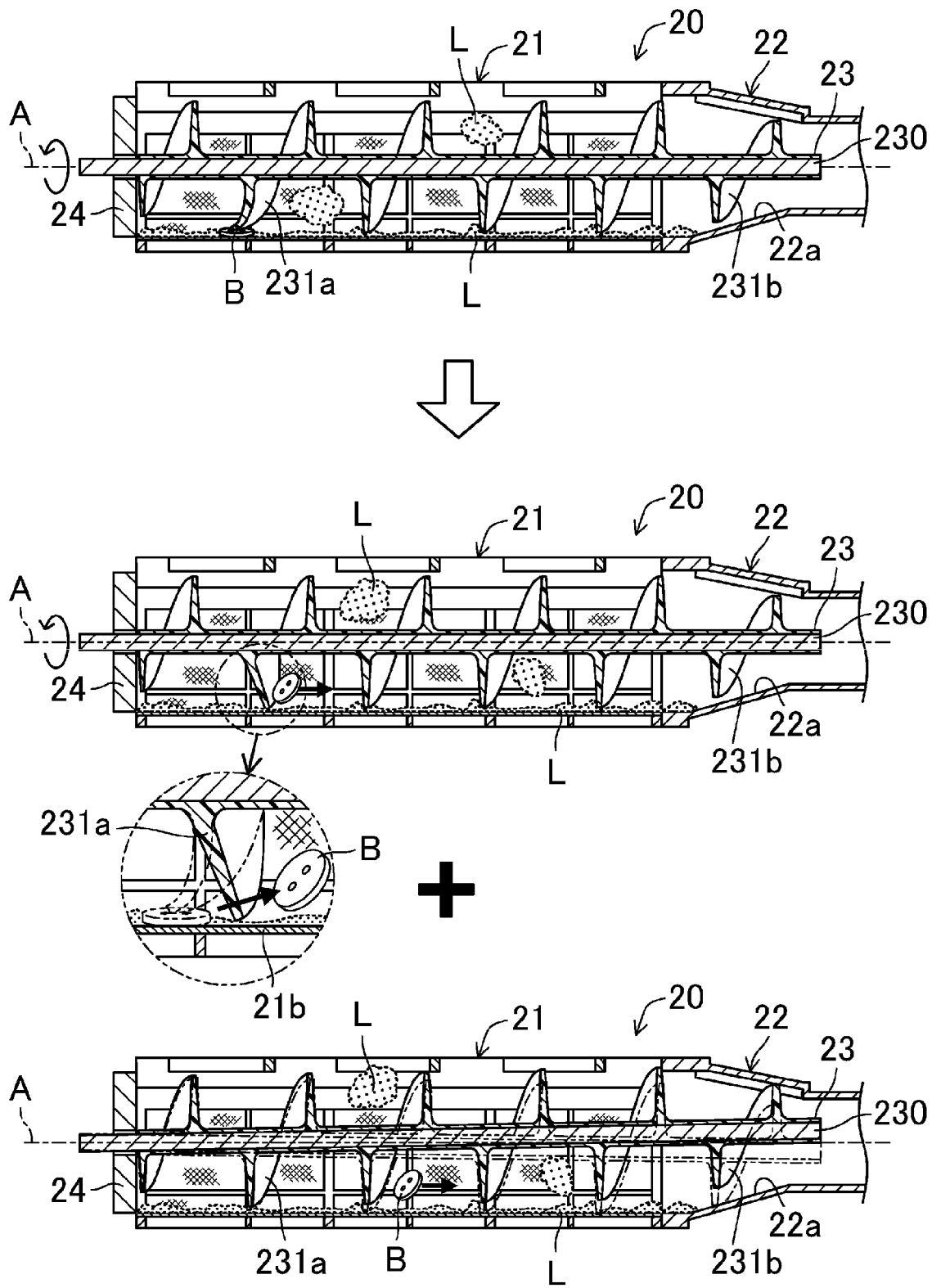
FIG. 6 is a view for explaining the operation of the lint removal device when foreign substances are introduced.

For example, it is assumed that a button B is introduced into the lint removal device 20 as illustrated in the upper view of FIG. 6. When the button B is caught between the blade 231 rotating and the filter 21b, the button B is strongly embedded in the filter 21b by the blade 231 rotating, so that the filter 21b may be damaged. In addition, the screw 23 may not be able to rotate, so that the motor 41 may be locked.

However, because the filter-side blade 231a of the screw 23 is not only made of a material of a low rigidity having elasticity, but also set to have a thin thickness, when an external force is applied on the filter-side blade 231a, the filter-side blade 231a is deformed to be easily bent by the external force.

Therefore, as illustrated in the middle view of FIG. 6, even when the button B is caught between the blade 231 rotating and the filter 21b, the filter-side blade 231a is deformed to be easily bent, so that a force by which the button B presses the filter 21b is reduced. Accordingly, damage to the filter 21b may be suppressed.

Because the button B caught is bounced off by the filter-side blade 231a, the button B may be removed from between the blade 231 and the filter 21b. Accordingly, damage to the filter 21b may be suppressed, and the button B may be transferred together with the lint L.

In addition, in the lint removal device 20, because one side of the screw 23 is supported by the bearing 24 in a clearance-fit manner, as illustrated by a solid line and a double-dashed line in the lower view of FIG. 6, when an external force is applied on the screw 23, the screw 23 shakes with the bearing 24 as a support point.

Therefore, when the button B is caught between the blade 231 rotating and the filter 21b, because the filter-side blade 231a is not only deformed, but also the screw 23 shakes, furthermore, damage of the filter 21b may be suppressed, and the button B may be transferred together with the lint L.

<Compression Assistance Part 80>

Figure 7B:
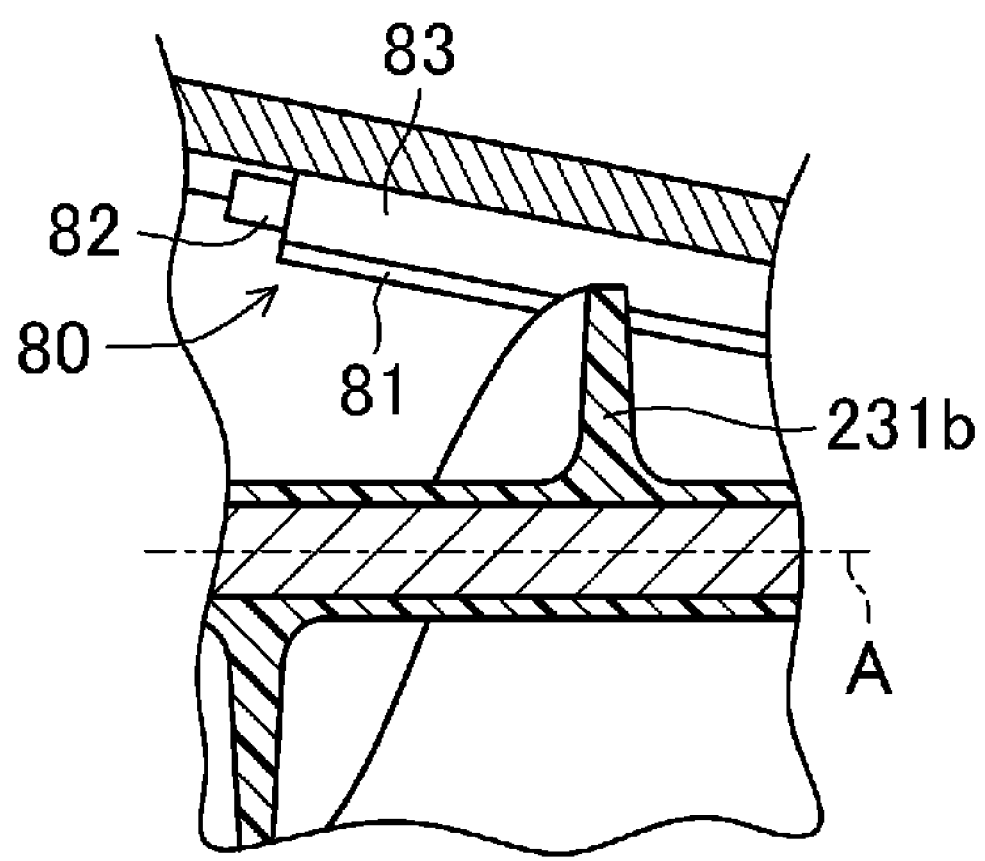
FIG. 7 B is a schematic cross-sectional view taken along line X-X in FIG. 7A.

As described above, the lint compression part 22 is provided with the compression assistance part 80. FIGS. 7A and 7B illustrate a structure of the compression assistance part 80.

The compression assistance part 80 according to the present embodiment includes a compression rib 81 extending along the tapered surface 22a, a rib support portion 82 to rotatably support the compression rib 81, and a rib regulating portion 83 to regulate rotation of the compression rib 81.

The compression rib 81 is configured to be rotatable to a position at which a front end thereof protrudes toward the outlet-side blade 231b (acting position, a portion indicated by a solid line in an enlarged view of FIG. 7A) and a position at which the front end thereof is spaced apart from the outlet-side blade 231b (non-acting position, a portion indicated by a double-dashed line in the enlarged view of FIG. 7A).

The rib regulating portion 83 regulates rotation of the compression rib 81 such that the compression rib 81 is located in an acting position when the screw 23 rotates in the direction of pushing the lint L (forward rotation, indicated by an arrow Y1). The rib regulating portion 83 is also configured such that the compression rib 81 rotates to be located in a non-acting position when the rotational direction of the screw 23 is reversed.

Therefore, when the screw 23 rotates forward, the lint L collected in the lint compression part 22 is compressed by the tapered surface 22a and the outlet-side blade 231b, and at this time the lint L is again blocked by the compression rib 81, so that compression becomes easier. In addition, because the compression rib 81 extends along the tapered surface 22a, the compressed lint L is guided to the lint outlet 22b by the compression rib 81.

In a case in which foreign substances is transferred to the lint compression part 22, when the compression assistance part 80 is provided, the motor 41 may be locked due to the foreign substances being caught between the compression assistance part 80 and the outlet-side blade 231b.

However, in the clothes dryer 1 of this embodiment, the controller 8 performs a process of rotating the screw 23 in the reverse direction (locking release process). Specifically, the controller 8 determines whether a current value of the motor 41 exceeds a predetermined threshold value while the clothes dryer 1 is operated. When the current value of the motor 41 exceeds the threshold value, the controller 8 determines that the motor 41 is locked and controls the screw 23 to rotate in the reverse direction for a predetermined time.

Accordingly, the compression rib 81 is moved to the non-acting position, so that a phenomenon of a foreign substance being caught is eliminated. Also, the controller 8 controls the screw 23 to rotate forward again. Because the lock canceling process is properly repeatedly executed, the foreign substances are discharged to the lint box 60 together with the lint L.

The clothes dryer according to the disclosed technology is not limited to the above-described embodiment, and may include various other configurations.

The filter-side blade 231a and the outlet-side blade 231b may be made of different materials. In this case, thicknesses of them may be the same.

The compression assistance part 80 may be configured as an elastically deformable member. For example, the compression rib 81 may be made of rubber. In this case, the compression rib 81 may be fixed to the tapered surface 22a, so that the rib support portion 82 and the rib regulating portion 83 may be excluded.

The rigidity, thickness, material, and the like of the blade 231 may be continuously different rather than intermittently different based on the filter part 21 and the lint compression part 22 as a boundary. The above configuration may also be applied to the distances between the screw 23 and the filter part 21 and the lint compression part 22.

The invention claimed is:
1. A clothes dryer comprising:
a drum configured to accommodate and dry clothes; and
a lint removal device configured to remove lint in air flowing out of the drum,
wherein the lint removal device comprises:
a filter part configured such that the lint is adhered;
a screw, which is rotatable, arrangeable at an inner side of the filter part such that while the screw is arranged at the inner side of the filter part, the screw rotates to push out the lint that is adhered to the filter part; and
a lint compression part connected to one end of the filter part to compress the lint pushed out by the screw and has a tapered surface gradually decreasing in diameter from the filter part, wherein the screw comprises:
    a shaft; and
    a blade, having a helical shape, extending along the shaft such that a first portion of the blade is located within the inner side of the filter part and a second portion of the blade is located within an area adjacent to the inner side of the filter part toward which the lint that is adhered to the filter part is pushed, and wherein the blade has elasticity and has a rigidity less than that of the shaft, wherein the lint compression part comprises:
    a compression assistance part protruding inward of the tapered surface to facilitate compression of the lint, wherein when a foreign substance is caught between the compression assistance part and the blade so that a forward rotation of the screw is impossible, the screw is rotated in a reverse direction, and wherein the compression assistance part comprises a compression rib extending along the tapered surface, and the compression rib is configured to be farther away from the blade when the screw is rotated in the reverse direction.

2. The clothes dryer according to claim 1, wherein a predetermined gap is formed between the screw and the filter part.

3. The clothes dryer according to claim 2, wherein the lint removal device further comprises:
    a driving device provided on one side of the lint removal device to rotate the screw.

4. The clothes dryer according to claim 1, wherein when a foreign substance is introduced into the lint removal device, damage to the filter part is prevented by the elasticity of the blade.

5. The clothes dryer according to claim 1, wherein the shaft is made of steel and the blade is made of plastic.

6. The clothes dryer according to claim 1, wherein the blade is configured such that a rigidity of the first portion of the blade located at the inner side of the filter part and a rigidity of the second portion of the blade which is located outside the inner side of the filter part and at an inner side of the lint compression part are different.

7. The clothes dryer according to claim 1, wherein the blade is made of a single material.

8. The clothes dryer according to claim 7, wherein the blade is configured such that a thickness of the first portion of the blade located at the inner side of the filter part and a thickness of the second portion of the blade which is located outside the inner side of the filter part and at an inner side of the lint compression part are different.

9. The clothes dryer according to claim 1, wherein the lint removal device further comprises a bearing configured to support one side of the screw so that the screw is rotatable.

10. The clothes dryer according to claim 9, wherein the screw is configured to move relative to the bearing when an external force is applied on the screw.

\* \* \* \* \*